July 4, 1933.                L. W. HOTTEL                1,916,798
                MOLDING PRESS FOR HOLLOW ARTICLES
                Filed Jan. 27, 1930            2 Sheets-Sheet 1

Inventor
Louis W. Hottel,
By
    Attorney

Inventor
Louis W. Hottel,
By
Attorney

Patented July 4, 1933

1,916,798

UNITED STATES PATENT OFFICE

LOUIS W. HOTTEL, OF INDIANAPOLIS, INDIANA

MOLDING PRESS FOR HOLLOW ARTICLES

Application filed January 27, 1930. Serial No. 423,813.

This invention relates to that type of molding press for hollow articles possessing special utility in the manufacture of electric storage battery boxes from a plastic composition, and has for its primary object to provide a novel mold construction, and automatic mold closing and opening means which facilitates and speeds production while also insuring the making of a uniformly satisfactory article with a minimum of defects and breakages. Also the invention contemplates a construction to automatically compensate for the wear caused by sleeving the plate assembly into and out of the mold case or die-box.

Other objects and advantages of the invention will appear as the details of the same are herein described and it will be understood that the invention consists in the novel construction, combination, and arrangement of parts herein pointed out, illustrated and claimed, and while susceptible of modification a preferred and practical embodiment of the invention is shown in the accompanying drawings, in which:

Figure 4 is a detail perspective view showing one means of pivotally articulating the mold lining plates to permit of the hinging or pivoting action thereof in the opening or closing of the mold.

Figure 5 is a detail view of the core, partly in section, showing the air valve device applied thereto, and also showing by dotted lines a preferred arrangement of fluid circulating passages for either a cooling or heating agent according to whether the press is operating on cold setting materials or as a vulcanizing press.

Figure 1:
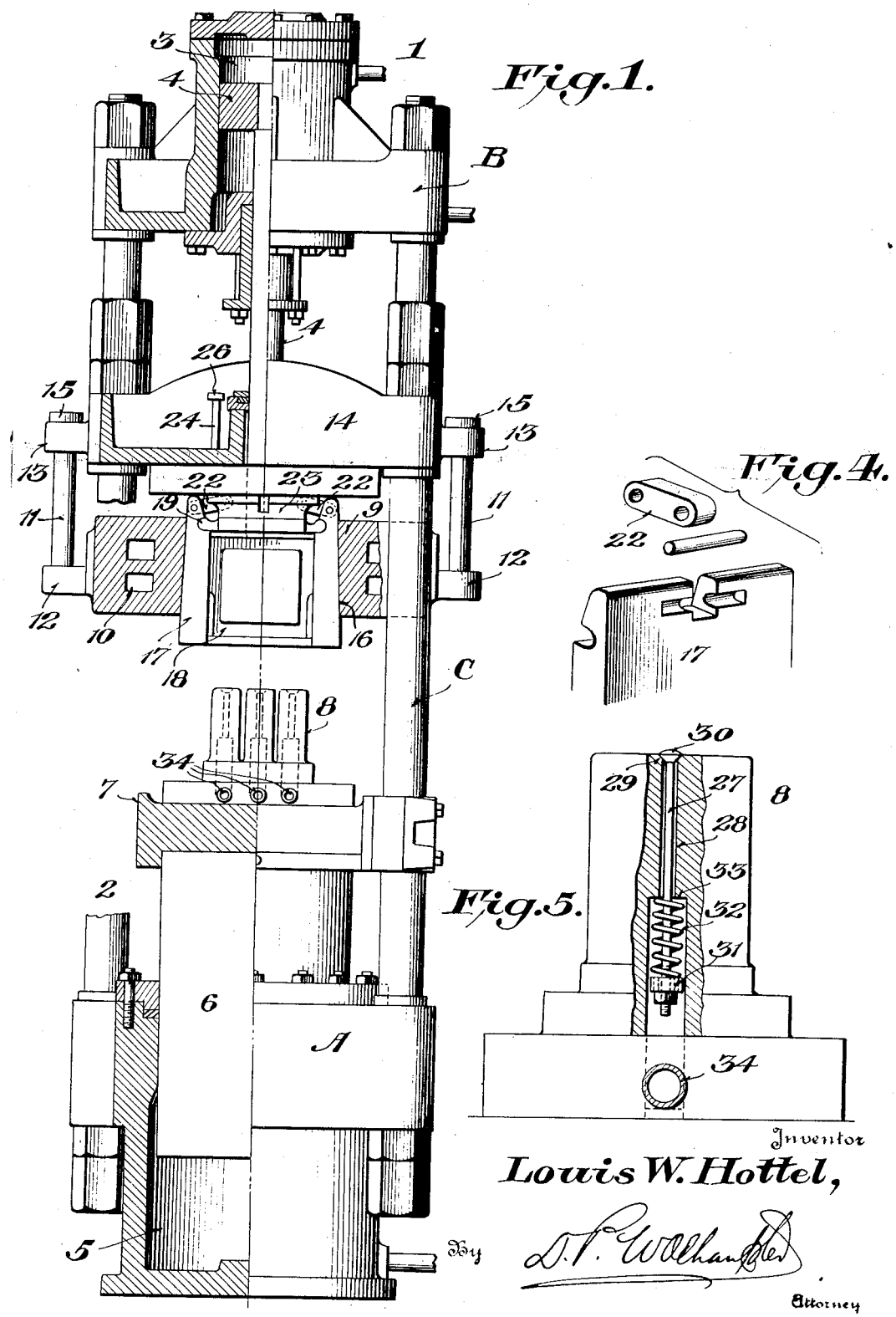
Figure 1 is an elevation partly in section of a molding press embodying the present invention.

The improvements contemplated by the present invention are preferably associated with a press of the type illustrated in the drawings and this press includes in its general organization a press base A and a press head B connected together by the frame or tie rods C and supporting at the top an upper power unit 1 and at the bottom a lower power unit 2. The upper power unit includes a cylinder 3 having a source of power supply and a piston 4 therein having a suitable operating connection with the mold in the manner to be presently explained. The said lower power unit 2 includes the ram cylinder 5 having the usual power supply connection and exhausting means associated therewith and the hydraulic ram 6 operating in said cylinder and carrying at its upper end the press platen 7 on which is mounted the mold core 8 which cooperates with the suspended mold carried by the upper part of the press structure.

The suspended mold includes in its organization a self-adjusting mold case or die-box 9 provided therein with circulating passages 10 for a cooling or heating fluid, according to the character of plastic composition employed in making the plastic box or hollow molded article. The said mold case or die-box 9 is held and guided in a loosely suspended condition by suitable holding means such as the sliding holding pins 11 seated at their lower ends as at 12 to brackets or ears on the mold case or die-box and guided for sliding movement in the openings of the guide ears 13 or equivalent guiding means carried by a supporting cross-head 14 seated within the upper part of the press frame below the upper press head B.

The mold case or die-box 9 as thus suspended is free to move upwardly by the power-operated mold proper and to drop by gravity to a position where it is arrested by the stop heads 15 at the upper ends of the rods 11 when the mold proper is lowered. The opening 16 through the mold case or die-box 9 is tapered to correspond with the external taper of the mold proper and this mold proper preferably consists of a group or assembly of articulated mold lining plates 17 and 18. These mold lining plates 17 and 18 are pivotally mounted or hinged near their upper edges upon pivot elements 19 projecting from a mold bottom plate 20 which is fastened as at 21 to the lower end of the upper piston rod 4 so that the entire mold will be carried up and down by the piston rod under the influence of the power supplied to the upper power unit cylinder 3. In addition to having a hinged or pivotal mounting on the mold bottom plate 20 each of the mold lining plates 17 and 18 has a pivotal link connection 22 with a fulcrum block 23. This fulcrum block is slidably fitted over the upper piston rod 4 and is freely suspended for an up and down movement upon the holding pins 24 which slidably move through guide openings 25 in the supporting cross-head 14 and are provided at the upper ends with stop shoulders or heads 26 which limit or arrest the downward movement of the fulcrum block 23.

Figure 2:
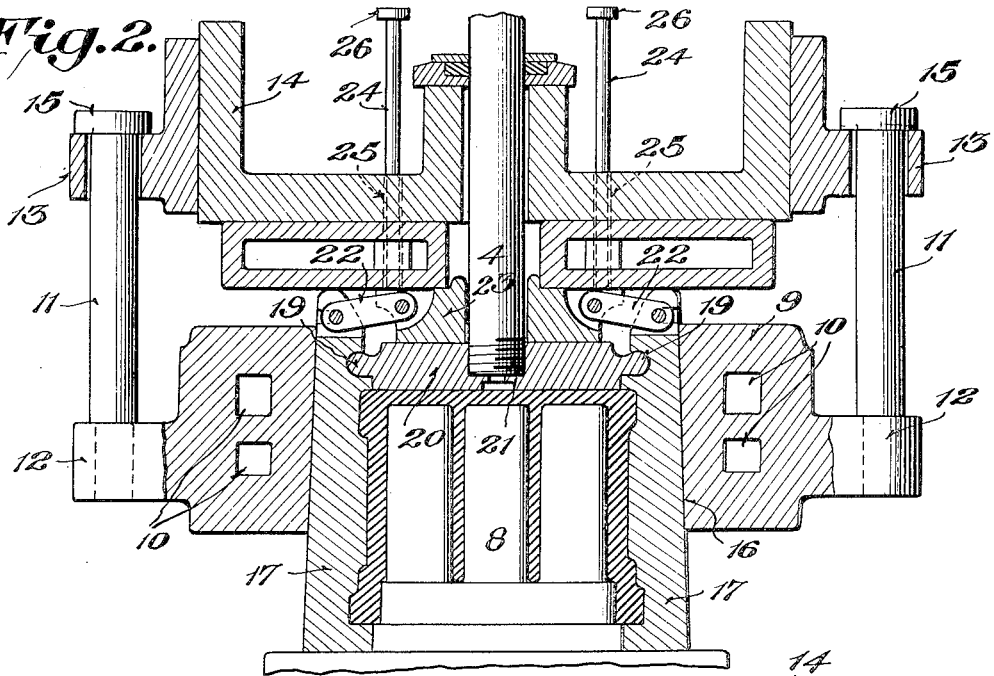
Figure 2 is an enlarged detail view of the mold construction showing the various parts of the mold assembly in their closed relation, showing a battery box formed or molded therein.
Figure 3:
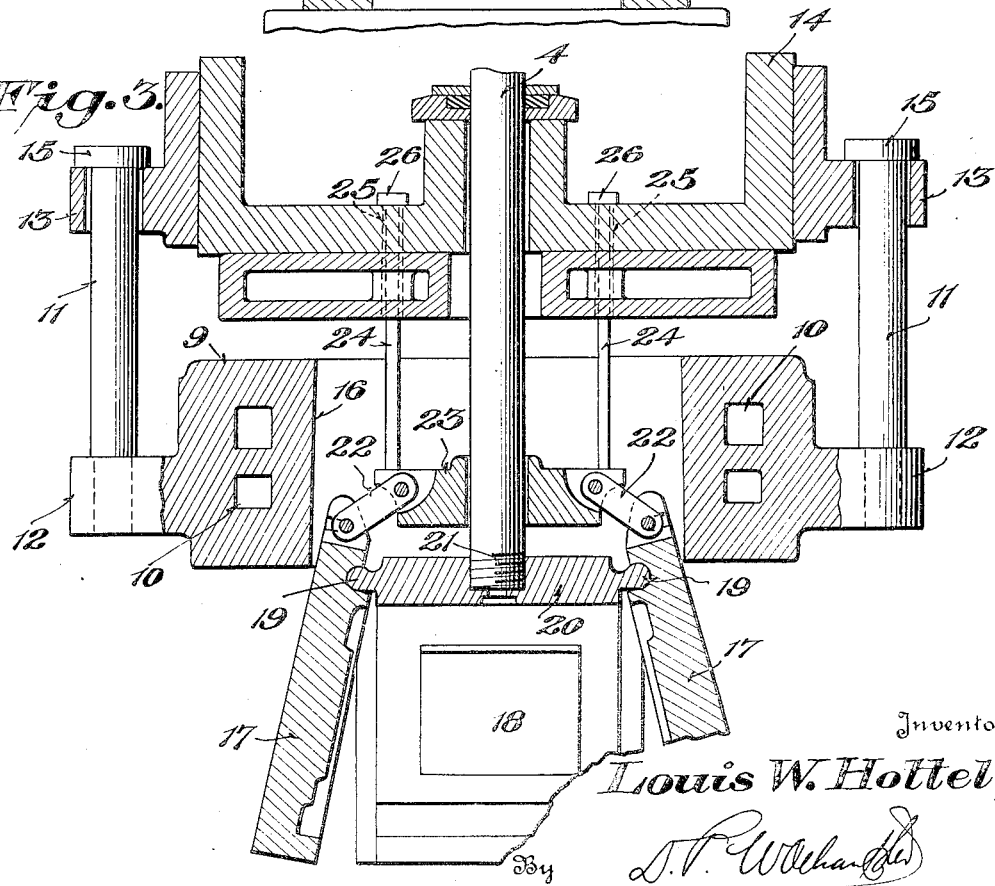
Figure 3 is a view similar to Figure 2 of the mold parts also, as they appear when discharging a molded box or other article.

In the operation of the press with the parts shown in the position shown in Figure 1, the core 8 with the lump of plastic composition material thereon is forced by power upward into the inclosed press to thereby form, under great pressure a battery box or equivalent hollow molded article as shown in Figure 2 of the drawings. When the composition material of which this article is made has become sufficiently hard by chilling or heating, as the case may be, power is cut off from the lower end and at the same time supplied to the upper power unit with the result of lowering the mold proper, consisting of the articulated plates to a point where the downward movement of the mold case 9 is arrested by the stops 15 and thereupon the articulated mold proper moves out of the opening 16 in the mold case and continues a distance downward until the downward movement of the fulcrum block 23 is stopped by the heads 26 of the holding pins 24 and when that occurs the further downward movement of the piston rod 4 which is connected with the mold bottom plate 20 causes the mold lining plates 17 and 18 to swing outwardly upon their hinge or pivot connections 19 in which movement the links 22 act as fulcrum links for holding the upper edges of the mold lining plates while at the same time permitting the swinging action referred to. This operation results in the opening up of the mold and permitting the complete release of the molded article which can be readily and quickly handled by the operator.

A feature of practical importance in connection with the self-adjusting mold case or die-box 9 is that such mounting of the mold case or die-box permits an automatic take-up on the lining plate assembly to compensate for the wear caused by sleeving the plate assembly into and out of the mold case or die-box. This always provides for a snug tight fitting of the mold proper within the mold case or die-box and insures a tight mold which practically eliminates the possibility of leakage of the plastic composition when placed under pressure. This is a very desirable feature in battery box making as it eliminates the production of fins on the exterior of the battery box due to the squeezing out of material at loose joints, or other points of escape.

When the core is drawn out of the box or molded article there is easily produced a vacuum within the bottom of the box which tends to increase the resistance to the withdrawal of the core and the present invention proposes to remedy that condition by fitting the core with an automatic air valve 27. This automatic air valve may preferably consist of a valve stem mounted in a venting opening 28 formed longitudinally in the central part of the core 18 and at its upper end formed into a valve seat 29 in which is seated the air valve head 30 at the upper end of the valve stem 27, the lower end of the valve stem may be fitted with an adjustable nut or equivalent device 31 upon which is seated a coil spring 32 interposed between the nut 31 and interior shoulder 33 of the core. The vent opening 28 is enlarged to accommodate the nut 31 of the spring 32 and communicates at its lower end with a suitably disposed air inlet 34.

With the construction described, when the core starts to withdraw from the battery box and tends to "pull" a vacuum, the air valve 27—30 will automatically open permitting the vacuum to be broken and thus relieve the core from that resistance and permit it more readily to retreat from the battery box at its lower position ready for the next operation. It should be understood, in connection with the operation of the air valve device described that in the use of some plastic compositions it might be difficult to break the vacuum above the core when it starts to withdraw by merely atmospheric pressure by passing through the air inlet valve 34 and under such conditions the requisite air pressure can be supplied through a suitable hose or pipe connection with the inlet 34 to introduce air under suitable pressure.

From the foregoing it is thought that the construction and operation of the invention will now be readily understood and it also will be understood that changes in the form, proportion and minor details of construction may be resorted to without departing from the spirit or sacrificing any of the advantages of the invention.

I claim:

1. In a molding press, an articulated mold plate assembly movable upward to a closed position and downward to an open position, a mold case having a downwardly and outwardly flaring opening receiving the mold plate assembly when the latter is in its upper closed position, and means independent of said mold case operable positively to effect closing of the mold plates relative to one another by upward movement of the mold plate assembly, said mold case being mounted for vertical movement and being adapted to be lifted by the mold plate assembly during upward movement of said assembly whereby the full weight of the mold case is effective to produce a wedging closing action against the mold plates when the mold is closed.

2. In a molding press, an articulated mold plate assembly, a fulcrum plate movable relative to said mold plate assembly, link connections between said fulcrum plate and the mold plates, means for moving the mold plate assembly in a mold closing direction, and stop means for arresting movement of the fulcrum plate during movement of the mold plate assembly in a mold closing direction whereby the link connections between the fulcrum plate and the mold plates are rendered effective to produce closing movement of the mold plates relative to one another.

3. In a molding press, a vertically movable articulated mold plate assembly, a fulcrum plate vertically movable relative to said mold plate assembly, link connections between said fulcrum plate and said mold plates, means for moving the mold plate assembly to and from a mold closed position, stop means to arrest upward movement of the fulcrum plate during movement of the mold plate assembly to a mold closed position whereby said link connections are rendered effective to produce closing movement of the mold plates relative to one another, and means for arresting downward movement of said fulcrum plate following a predetermined amount of downward movement of the mold plate assembly from the mold closed position whereby said link connections are rendered effective to positively produce opening movement of the mold plates relative to one another.

4. In a molding press, an articulated mold plate assembly movable between closed and open positions, a fulcrum plate, link connections between said fulcrum plate and said mold plates, and means for arresting movement of said fulcrum plate during movement of said mold plate assembly to its closed and open positions whereby said link connections are rendered effective to positively produce closing and opening movements of said mold plates.

In testimony whereof I hereunto affix my signature.

LOUIS W. HOTTEL.